United States Patent
Poon

(10) Patent No.: US 8,160,028 B2
(45) Date of Patent: *Apr. 17, 2012

(54) SPATIAL PUNCTURING APPARATUS, METHOD, AND SYSTEM

(75) Inventor: Ada S. Y. Poon, San Leandro, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,751

(22) Filed: Apr. 1, 2010

(65) Prior Publication Data
US 2010/0189091 A1 Jul. 29, 2010

Related U.S. Application Data

(63) Continuation of application No. 10/875,111, filed on Jun. 23, 2004, now Pat. No. 7,710,925.

(51) Int. Cl.
*H04Q 7/00* (2006.01)
(52) U.S. Cl. .............. 370/334; 375/267; 455/562.1
(58) Field of Classification Search ......... 370/203, 370/208, 252–254, 310, 328, 334, 343, 345, 370/447, 477, 478, 480, 498; 375/260, 267, 375/299, 347; 455/561, 562.1
See application file for complete search history.

(56) References Cited

U.S. PATENT DOCUMENTS

| | | | |
|---|---|---|---|
| 6,134,231 A | 10/2000 | Wright et al. | |
| 6,774,864 B2 | 8/2004 | Evans et al. | |
| 6,801,775 B1 | 10/2004 | Gibbons et al. | |
| 6,917,820 B2 | 7/2005 | Gore et al. | |
| 2002/0003842 A1 | 1/2002 | Suzuki et al. | |
| 2002/0102950 A1 | 8/2002 | Gore et al. | |
| 2003/0083016 A1 | 5/2003 | Evans et al. | |
| 2003/0185309 A1 | 10/2003 | Paulter et al. | |
| 2003/0186698 A1 | 10/2003 | Holma et al. | |
| 2004/0002364 A1* | 1/2004 | Trikkonen et al. | 455/562.1 |
| 2004/0042558 A1 | 3/2004 | Hwang et al. | |
| 2005/0152473 A1 | 7/2005 | Maltsev et al. | |
| 2005/0157807 A1* | 7/2005 | Shim et al. | 375/267 |
| 2005/0219999 A1 | 10/2005 | Kim et al. | |
| 2005/0286404 A1 | 12/2005 | Poon | |

FOREIGN PATENT DOCUMENTS
WO 2006007138 1/2006

OTHER PUBLICATIONS

International Search Report and Written Opinion from corresponding international application, PCT/US2005/017653, filed May 20, 2005; mailed Aug. 31, 2005; 17 pages.

Office Action from related Chinese application, 200580020528.4, filed May 20, 2005; mailed Jul. 3, 2009; 11 pages.

(Continued)

*Primary Examiner* — Pao Sinkantarakorn
(74) *Attorney, Agent, or Firm* — Cool Patent, P.C.; Kenneth J. Cool

(57) ABSTRACT

Stations in a N×N multiple-input-multiple-output (MIMO) wireless network always puncture the weakest spatial channel. N−1 spatial channels are always used regardless of the channel state.

22 Claims, 6 Drawing Sheets

OTHER PUBLICATIONS

Office Action from related Taiwanese application, 94117248, filed May 20, 2005; mailed Aug. 16, 2006; 4 pages.

International Preliminary Report on Patentability from corresponding international application, PCT/US2005/017653, filed May 20, 2005; mailed Jan. 11, 2007; 2 pages.

Sandhu, Sumeet; Nabar, Rohit U.; Gore, Dhananjay A.; Paulraj, Arogyaswami; "Near-Optimal Selection of Transmit Antennas for a MIMO Channel Based on Shannon Capacity"; Signals, Systems and Computers; Oct. 29, 2000; 5 pages.

Gore et al.; "Selecting an Optimal Set of Transmit Antennas for a Low Rank Matrix Channel", Acoustics, Speech, and Signal Processing, 2000 IEEE International Conference, vol. 5, Jun. 5, 2000; pp. 2785-2788.

* cited by examiner

SPATIAL PUNCTURING APPARATUS, METHOD, AND SYSTEM

RELATED APPLICATION

This application is a Continuation of U.S. Nonprovisional application Ser. No. 10/875,111, by Poon, filed Jun. 23, 2004, which is incorporated herein by reference in its entirety for all purposes.

FIELD

The present invention relates generally to wireless networks, and more specifically to wireless networks that utilize multiple spatial channels.

BACKGROUND

Closed loop multiple-input-multiple-output (MIMO) systems typically transmit channel state information from a receiver to a transmitter. Transmitting the channel state information consumes bandwidth that would otherwise be available for data traffic.

DESCRIPTION OF EMBODIMENTS

Figure 1:
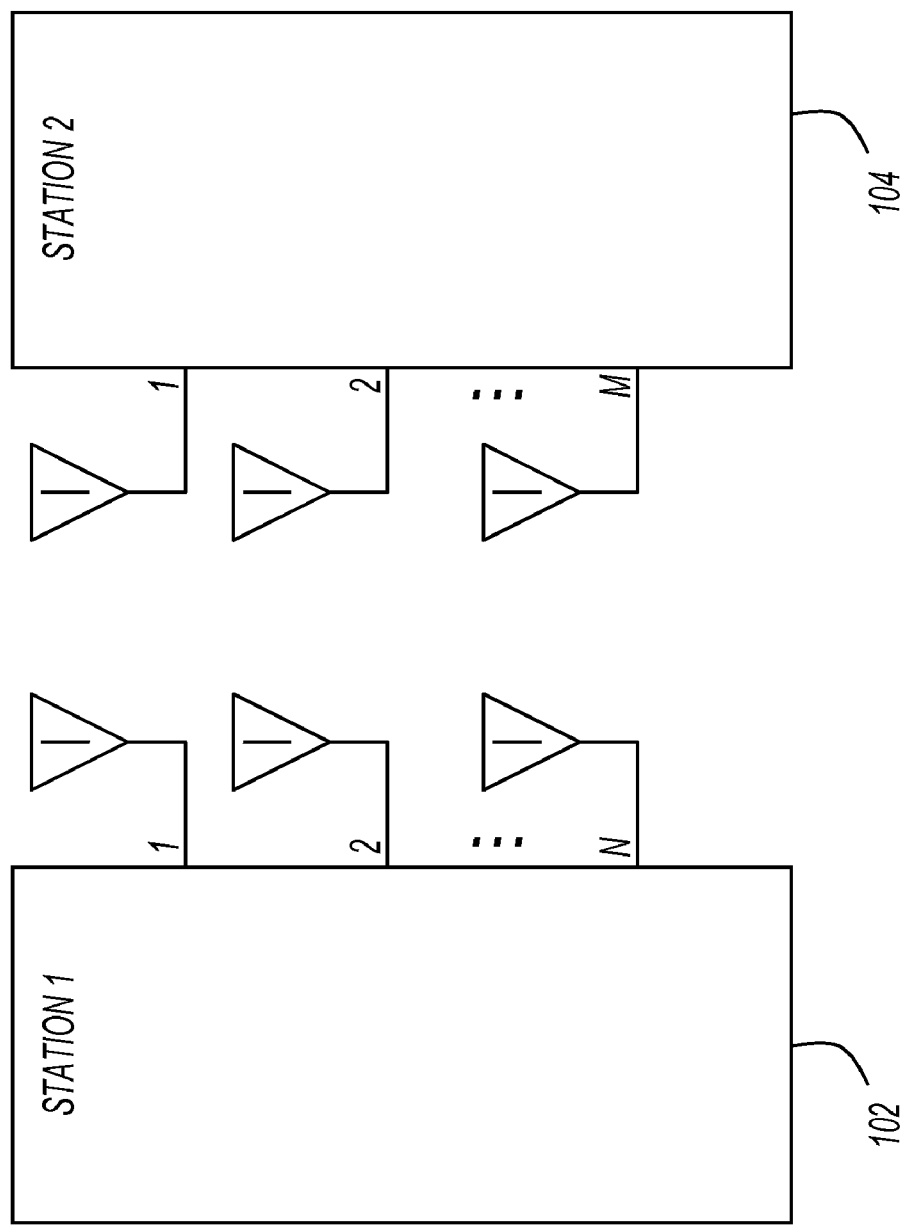
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station such as a laptop computer, personal digital assistant (PDA), or the like.

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

Stations 102 and 104 each include multiple antennas. Station 102 includes "N" antennas, and station 104 includes "M" antennas, where N and M may be any number. Further, N and M may or may not be equal. The remainder of this description discusses the case where N and M are equal, but the various embodiments of the invention are not so limited. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open loop MIMO systems, a station estimates the state of the channel without receiving channel state information directly from another station. In general, open loop systems employ exponential decoding complexity to estimate the channel. In closed loop systems, communications bandwidth is utilized to transmit current channel state information between stations, thereby reducing the necessary decoding complexity, and also reducing overall throughput. The communications bandwidth used for this purpose is referred to herein as "feedback bandwidth." When feedback bandwidth is reduced in closed loop MIMO systems, more bandwidth is available for data communications.

Three types of receiver architectures for MIMO systems include: linear, iterative, and maximum-likelihood (ML). In open-loop operation, ML receivers have much better performance than linear and iterative receivers. For example, at 1% packet error rate and 4×36 Mbps, ML receivers are 12 dB more power efficient than linear and iterative receivers, or equivalently, have four times better propagation range. However, ML receivers need $2\times10^5$ times more multiplication operations than linear and iterative receivers. To approach the performance of ML receivers with the complexity of linear receivers, and to reduce the feedback bandwidth, the various embodiments of the present invention utilize deterministic spatial channel puncturing with closed-loop operation.

As used herein, "puncturing" refers to the non-use of a particular spatial channel. For example, in a N×N MIMO system, various embodiments of the present invention use N−1 channels instead of N channels regardless of the instantaneous channel state information. The spatial puncturing is deterministic in the sense that one spatial channel is always punctured, and an N×N system will always use N−1 spatial channels. By always only utilizing N−1 spatial channels in a N×N MIMO system, the amount of channel state information to be transmitted is reduced, and the feedback bandwidth is reduced.

Figure 2:
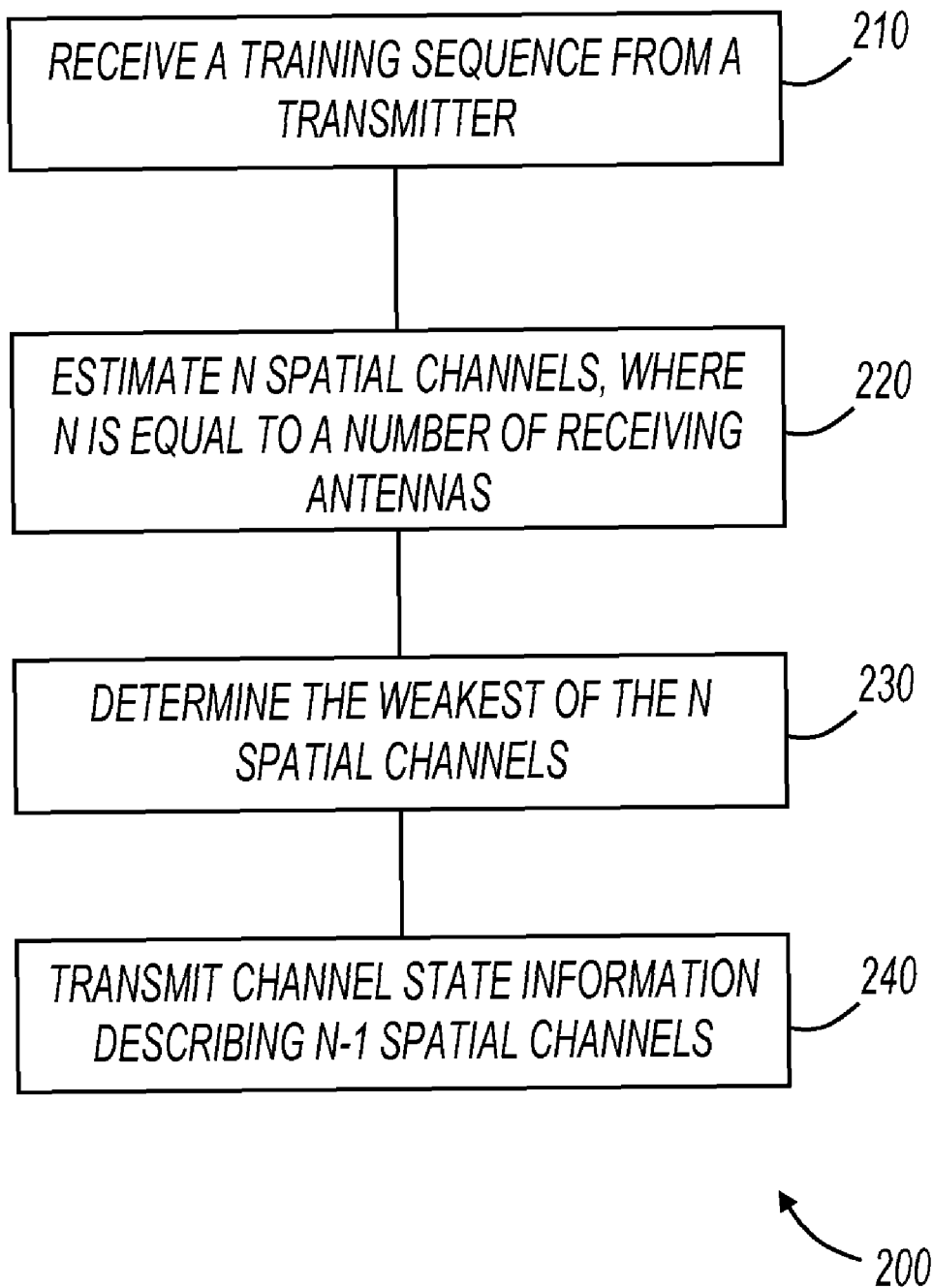
FIG. 2 shows a flowchart in accordance with various embodiments of the present invention.

FIG. 2 shows a flowchart in accordance with various embodiments of the present invention. In some embodiments, method 200 may be used in a wireless system that utilizes MIMO technology. In some embodiments, method 200, or portions thereof, is performed by a processor or electronic system, embodiments of which are shown in the various figures. In other embodiments, method 200 is performed by a wireless communications device. Method 200 is not limited by the particular type of apparatus or software element performing the method. The various actions in method 200 may be performed in the order presented, or may be performed in a different order. Further, in some embodiments, some actions listed in FIG. 2 are omitted from method 200.

Method 200 is shown beginning at block 210 in which a receiving station receives a training pattern from a transmitting station. For example, station 102 may transmit a training pattern, and station 104 may receive the training pattern. At 220, the receiving station estimates N spatial channels, where N is equal to a number of receiving antennas. In some embodiments, this may correspond to station 104 computing a current channel matrix describing the current state of the N spatial channels. At 230, the receiving station determines the weakest of the N spatial channels, and at 240, the receiving stations transmits back the channel state information describing the N−1 spatial channels. In some embodiments, the channel state information is in the form of a transmit beamforming matrix. In these embodiments, the receiver computes a transmit beamforming matrix from the current channel matrix and then sends the beamforming matrix back to the transmitter. In various embodiments of the present invention, one spatial channel is always punctured, and the transmit beamforming matrix is reduced in size, thereby reducing the feedback bandwidth. Mathematical descriptions of various acts shown in FIG. 2 are provided below.

Let the input/output (I/O) model be $$y=Hx+z$$

where $x_i$ is the signal on the ith transmit antenna, $y_i$ is the signal received at the ith receive antenna, $H_{ij}$ is the channel gain from the jth transmit antenna to the ith receive antenna, and $z_i$ is the noise on the ith receive antenna. In closed-loop MIMO, the receiver may send a pre-coding matrix P back to the transmitter and the I/O model becomes $$y=HPx+z$$

Upon singular value decomposition (SVD), we have $$H=U\Sigma V^y$$

where U and V are N×N unitary matrices, and $\Sigma$ is a diagonal matrix with positive entries. Matrix V is the transmit beamforming matrix. When V represents N spatial channels, V includes $2N^2$ real numbers, and when V represents N−1 channels, V includes $2N(N-1)$ real numbers.

Assume elements of H are independent complex Gaussian distributed with zero mean and unit variance. Denote the gain of the ith spatial channel as $\lambda_i (\lambda_1 \geq \lambda_1 \geq \ldots \geq \lambda_N)$, where $\lambda_i$ denotes the entries in diagonal matrix $\Sigma$. The distribution of $\lambda_N$ can be shown as $$f(\lambda)=Ne^{-\lambda N},$$

from which its expected value may be derived as $$E[\lambda_N]=\frac{1}{N}.$$

Also, the overall expected value for $\lambda_i$ may be derived as $$E\left[\frac{1}{N}(\lambda_1+\lambda_2+\ldots+\lambda_N)\right]=N.$$

Accordingly, the ratio of the expected gain of the weakest spatial channel to the overall expected gain is $$\frac{E[\lambda_N]}{E\left[\frac{1}{N}(\lambda_1+\lambda_2+\ldots+\lambda_N)\right]}=\frac{1}{N^2}.$$

As shown above, the gain of the weakest spatial channel is $1/N^2$ of the overall expected gain. For example, the gain of the weakest spatial channel is 9.5 dB below the overall expected gain in a 3×3 system and is 12 dB below the overall expected gain in a 4×4 system. In the various embodiments of the present invention, this weakest spatial channel is always punctured for N>2, and the size of the feedback matrix becomes N(N−1) instead of $N^2$. This reduces not only the feedback bandwidth but also the computational complexity because the receiver now needs to compute N−1 beamforming vectors instead of N beamforming vectors and utilizes N spatial channels. In addition to reducing the feedback bandwidth, the performance of the communications link as measured by various parameters may increase as a result of always puncturing one spatial channel.

Figure 3:
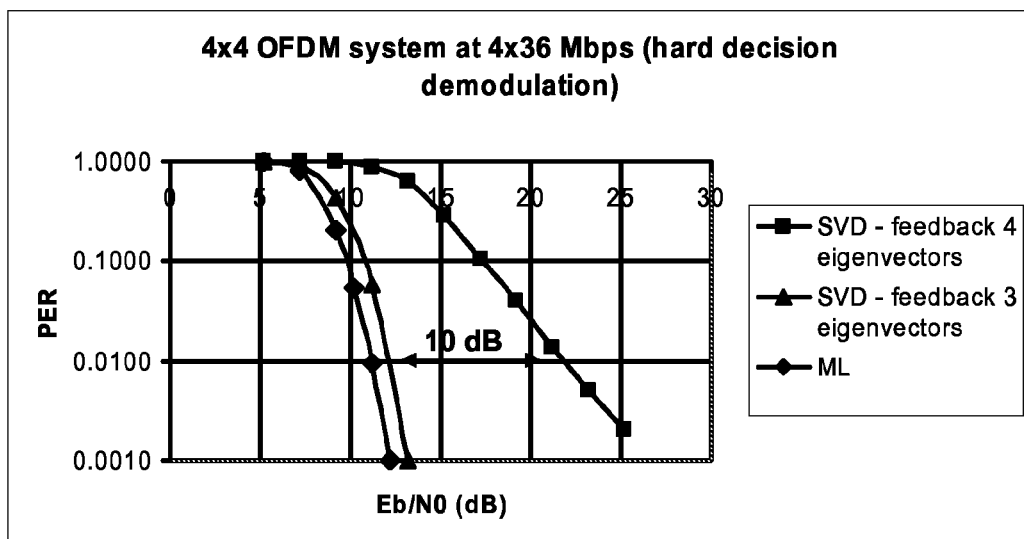
FIG. 3 shows simulation results.

FIG. 3 shows simulation results comparing the performance of one embodiment of the present invention, as well as the performance of a ML system and a system that feeds back all N beamforming vectors. The performance measure shown in FIG. 3 plots the packet error rate vs. $E_b/N_0$ of a 4×4 48-tone OFDM system using a 64-state convolutional code, space-time interleaver, and 64-QAM with hard-decision demodulation. As can be seen in FIG. 3, in a 4×4 system, when the receiver drops the weakest spatial channel and only sends three beam-forming vectors, the system performance approaches the ML openloop receiver and is much better than that of sending all beamforming vectors.

Figure 4:
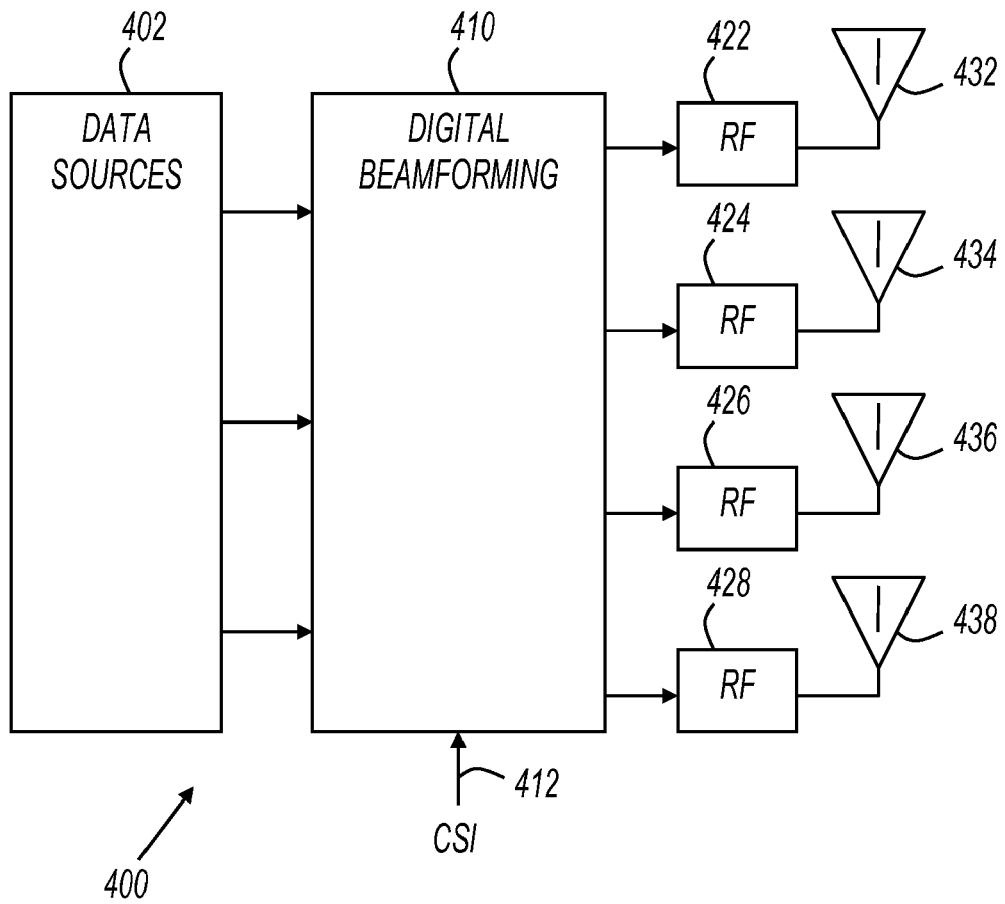
FIG. 4 shows a diagram of a wireless communications device.

FIG. 4 shows a transmitter with digital beamforming. Transmitter 400 may be included in a station such as station 102 or station 104 (FIG. 1). Transmitter 400 includes data sources 402, digital beamforming block 410, radio frequency (RF) blocks 422, 424, 426, and 428, and antennas 432, 434, 436, and 438. Digital beamforming block 410 receives three data signals from data sources 402 and forms signals to drive four antennas. In operation, digital beamforming block 410 receives channel state information (CSI) on node 412. In some embodiments, the channel state information is in the form of beamforming vectors received from another station. In embodiments represented by FIG. 4, digital beamforming block 410 receives three beamforming vectors, each of length four. This corresponds to a N×N−1 feedback matrix with N=4.

Transmitter 400 always punctures one spatial channel. In the example embodiments represented by FIG. 4, N=4, one spatial channel is always punctured, and three spatial channels are always used. Because three spatial channels are always used, data sources 402 only includes three baseband data circuits to source three separate data streams. This is contrast to a transmitter that includes four baseband data circuits to source four separate data streams, even though one may be punctured.

Radio frequency blocks 422, 424, 426, and 428 may include circuitry to modulate signals, frequency convert signals, amplify signals, or the like. For example, RF blocks 422, 424, 426, and 428 may include circuits such as mixers, amplifiers, filters, or the like. The present invention is not limited by the contents or function of RF blocks 422, 424, 426, and 428.

Transmitter 400 may include many functional blocks that are omitted from FIG. 4 for ease of illustration. For example, transmitter 400 may include a scrambler, a forward error correction (FEC) encoder, interleaver, an M-ary quadrature amplitude modulation (QAM) mapper and other functional blocks.

The various items shown in FIG. 4 may be implemented in many different ways. For example, in some embodiments, portions of transmitter 400 are implemented in dedicated hardware, and portions are implemented in software. In other embodiments, all of transmitter 400 is implemented in hardware. The present invention is not limited in this respect.

Figure 5:
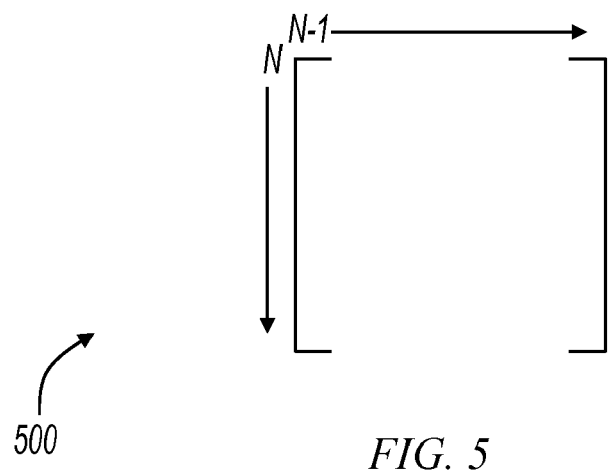
FIG. 5 shows dimensions of a channel state information matrix.

FIG. 5 shows dimensions of a channel state information matrix. Matrix 500 represents a channel state information matrix that may be transmitted back to a transmitter from a receiver. In some embodiments, matrix 500 corresponds to a beamforming matrix V, described above, having dimensions N×N−1. This corresponds to an N×N MIMO system that always punctures one spatial channel. In embodiments in which N=4, a beamforming matrix having the same dimensions as matrix 500 may be input to digital beamforming block 410 at node 412 (FIG. 4).

Figure 6:
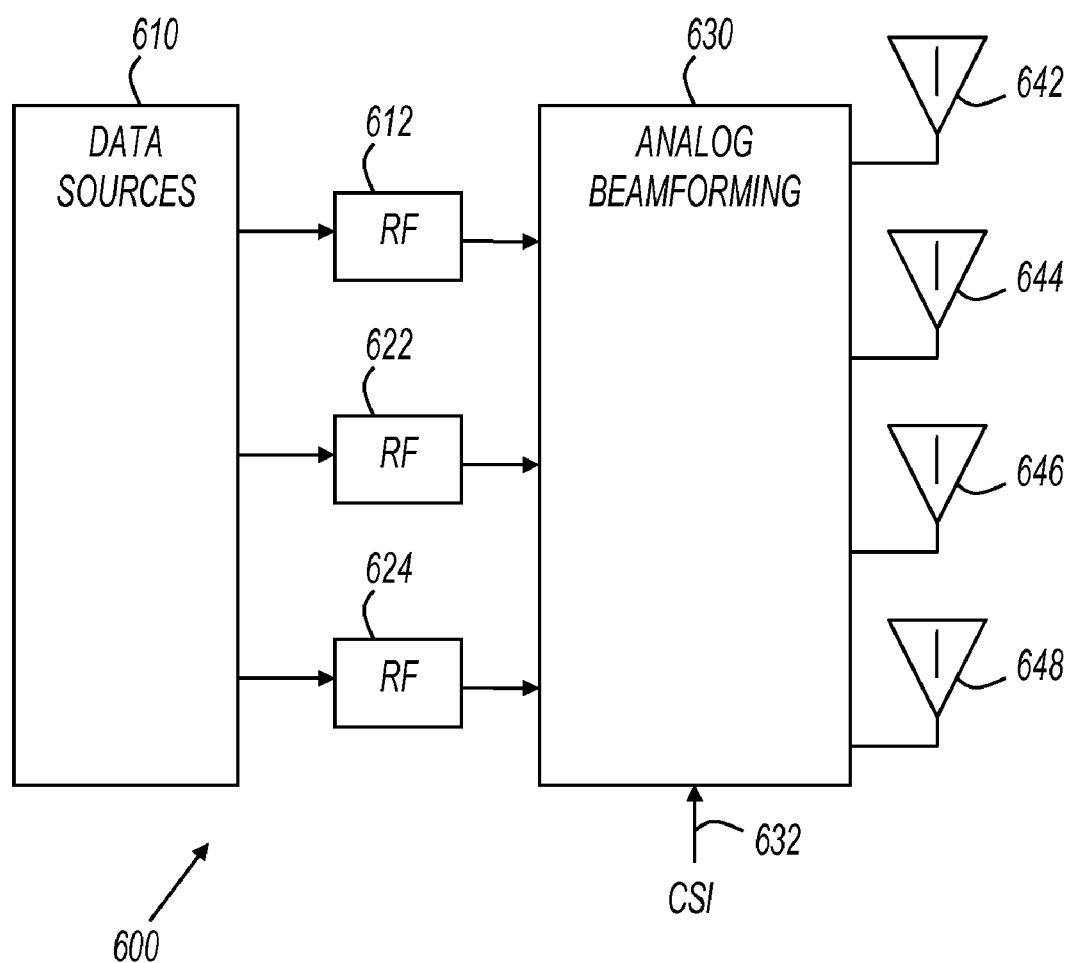
FIG. 6 shows a diagram of a wireless communications device.

FIG. 6 shows a transmitter with analog beamforming. Transmitter 600 may be included in a station such as station 102 or station 104 (FIG. 1). Transmitter 600 includes data sources 610, RF blocks 612, 622, and 624, analog beamforming block 630, and antennas 642, 644, 646, and 648. Analog beamforming block 630 receives three RF signals from RF blocks 612, 622, and 624 and forms signals to drive four antennas. In operation, analog beamforming block 630 receives channel state information (CSI) on node 632. In some embodiments, the channel state information is in the form of beamforming vectors received from another station. In embodiments represented by FIG. 6, analog beamforming block 630 receives three beamforming vectors, each of length four. This corresponds to a N×N−1 feedback matrix such as matrix 500 (FIG. 5) with N=4.

Transmitter 600 always punctures one spatial channel. In the example embodiments represented by FIG. 6, N=4, one spatial channel is always punctured, and three spatial channels are always used. Because three spatial channels are always used, data sources 610 only includes three baseband data circuits to source three separate data streams. Further, because three spatial channels are always used, transmitter 600 only has three RF blocks 612, 622, and 624. This is contrast to a transmitter that includes four baseband data circuits and four RF blocks to source four separate data streams, even though one may be punctured.

Radio frequency blocks 612, 622, and 624 may include circuitry to modulate signals, frequency convert signals, amplify signals, or the like. For example, RF blocks 612, 622, and 624 may include circuits such as mixers, amplifiers, filters, or the like. The present invention is not limited by the contents or function of RF blocks 612, 622, and 624.

Transmitter 600 may include many functional blocks that are omitted from FIG. 6 for ease of illustration. For example, transmitter 600 may include a scrambler, a forward error correction (FEC) encoder, interleaver, an M-ary quadrature amplitude modulation (QAM) mapper and other functional blocks.

Figure 7:
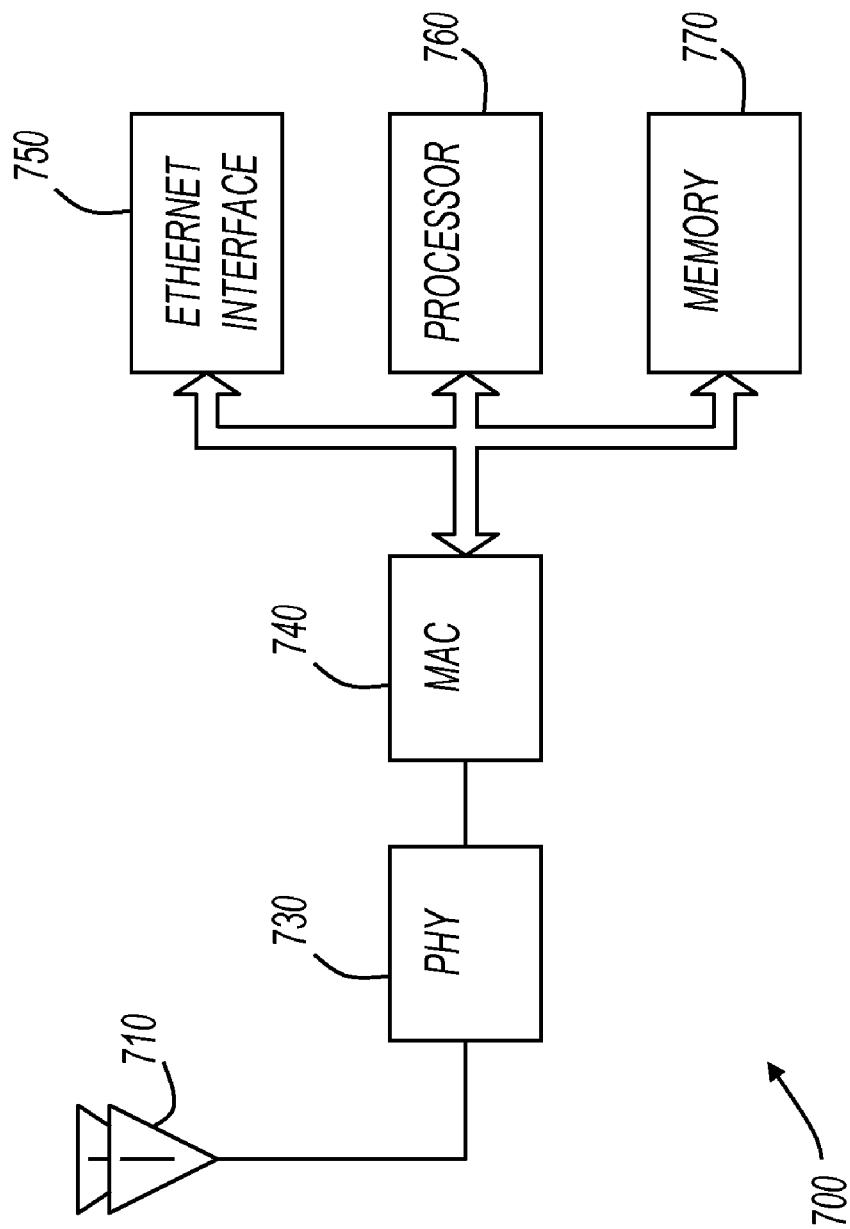
FIG. 7 shows a system diagram in accordance with various embodiments of the present invention.

FIG. 7 shows a system diagram in accordance with various embodiments of the present invention. Electronic system 700 includes antennas 710, physical layer (PHY) 730, media access control (MAC) layer 740, Ethernet interface 750, processor 760, and memory 770. In some embodiments, electronic system 700 may be a station capable of puncturing one spatial channel. For example, electronic system 700 may be utilized in a wireless network as station 102 or station 104 (FIG. 1). Also for example, electronic system 700 may be a transmitter such as transmitter such as transmitter 400 (FIG. 4) or 600 (FIG. 6) capable of beamforming, or may be a receiver capable of performing channel estimation and determining a weakest spatial channel to be punctured.

In some embodiments, electronic system 700 may represent a system that includes an access point or mobile station as well as other circuits. For example, in some embodiments, electronic system 700 may be a computer, such as a personal computer, a workstation, or the like, that includes an access point or mobile station as a peripheral or as an integrated unit. Further, electronic system 700 may include a series of access points that are coupled together in a network.

In operation, system 700 sends and receives signals using antennas 710, and the signals are processed by the various elements shown in FIG. 7. Antennas 710 may be an antenna array or any type of antenna structure that supports MIMO processing. System 700 may operate in partial compliance with, or in complete compliance with, a wireless network standard such as an 802.11 standard.

Physical layer (PHY) 730 is coupled to antennas 710 to interact with a wireless network. PHY 730 may include circuitry to support the transmission and reception of radio frequency (RF) signals. For example, in some embodiments, PHY 730 includes an RF receiver to receive signals and perform "front end" processing such as low noise amplification (LNA), filtering, frequency conversion or the like. Further, in some embodiments, PHY 730 includes transform mechanisms and beamforming circuitry to support MIMO signal processing. Also for example, in some embodiments, PHY 730 includes circuits to support frequency up-conversion, and an RF transmitter.

Media access control (MAC) layer 740 may be any suitable media access control layer implementation. For example, MAC 740 may be implemented in software, or hardware or any combination thereof. In some embodiments, a portion of MAC 740 may be implemented in hardware, and a portion may be implemented in software that is executed by processor 760. Further, MAC 740 may include a processor separate from processor 760.

In operation, processor 760 reads instructions and data from memory 770 and performs actions in response thereto. For example, processor 760 may access instructions from memory 770 and perform method embodiments of the present invention, such as method 200 (FIG. 2) or methods described with reference to other figures. Processor 760 represents any type of processor, including but not limited to, a microprocessor, a digital signal processor, a microcontroller, or the like.

Memory 770 represents an article that includes a machine readable medium. For example, memory 770 represents a random access memory (RAM), dynamic random access memory (DRAM), static random access memory (SRAM), read only memory (ROM), flash memory, or any other type of article that includes a medium readable by processor 760. Memory 770 may store instructions for performing the execution of the various method embodiments of the present invention.

Although the various elements of system 700 are shown separate in FIG. 7, embodiments exist that combine the circuitry of processor 760, memory 770, Ethernet interface 750, and MAC 740 in a single integrated circuit. For example, memory 770 may be an internal memory within processor 760 or may be a microprogram control store within processor 760. In some embodiments, the various elements of system 700 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 750 may provide communications between electronic system 700 and other systems. For example, in some embodiments, electronic system 700 may be an access point that utilizes Ethernet interface 750 to communicate with a wired network or to communicate with other access points. Some embodiments of the present invention do not include Ethernet interface 750. For example, in some embodiments, electronic system 700 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving a training sequence from a transmitter;
   estimating N spatial channels, wherein N is greater than one and equal to a number of receiving antennas;
   transmitting channel state information to the transmitter using only N−1 spatial channels, wherein the channel state information always only describes N−1 spatial channels.

2. The method of claim 1 wherein the channel state information includes a beamforming matrix to cause the transmitter to utilize N−1 spatial channels.

3. The method of claim 2 wherein N is equal to four.

4. The method of claim 2 wherein N is equal to three.

5. The method of claim 1 wherein the channel state information describes spatial channels in an orthogonal frequency division multiplexing (OFDM) multiple-input-multiple-output (MIMO) system.

6. A non-transitory computer-readable medium encoded with instructions that when executed by a computer cause the computer to perform:
   receiving a training sequence from a transmitter;
   estimating N spatial channels, wherein N is greater than one and equal to a number of receiving antennas;
   transmitting channel state information to the transmitter, wherein the channel state information always only describes N−1 spatial channels.

7. The computer-readable medium of claim 6 wherein the channel state information includes a beamforming matrix to cause the transmitter to utilize N−1 spatial channels.

8. The computer-readable medium of claim 6 wherein the channel state information describes spatial channels in an orthogonal frequency division multiplexing (OFDM) multiple-input-multiple-output (MIMO) system.

9. A wireless communications device having N antennas, the wireless communications device having a combination of hardware and software components to determine and puncture a weakest of N spatial channels, wherein the wireless communications device includes a combination of hardware and software to estimate N spatial channels and to transmit channel state information as a beamforming matrix corresponding to only N−1 spatial channels, where N is greater than one and the beamforming matrix corresponding to the N−1 spatial channels is fed back to another wireless communication device.

10. The wireless communications device of claim 9 wherein the wireless communications device includes N−1 baseband data circuits to source data to a beamforming network.

11. The wireless communications device of claim 9 wherein N is equal to four, and three spatial channels are always used.

12. The wireless communications device of claim 9 wherein N is equal to three, and two spatial channels are always used.

13. A method comprising:
   receiving a training sequence from a transmitter;
   estimating N spatial channels in a multiple-input-multiple-output (MIMO) system, wherein N is greater than one and equal to a number of receiving antennas;
   performing singular value decomposition to determine a transmit beamforming matrix;
   removing one transmit beamforming vector from the transmit beamforming matrix to yield N−1 transmit beamforming vectors; and
   transmitting the N−1 transmit beamforming vectors to the transmitter.

14. The method of claim 13 wherein N is equal to four.

15. The method of claim 13 wherein N is equal to three.

16. A non-transitory computer-readable medium encoded with instructions that when executed by a computer cause the computer to perform:
   receiving a training sequence from a transmitter;
   estimating N spatial channels in a multiple-input-multiple-output (MIMO) system, wherein N is greater than one and equal to a number of receiving antennas;
   performing singular value decomposition to determine a transmit beamforming matrix;
   removing one transmit beamforming vector from the transmit beamforming matrix to yield N−1 transmit beamforming vectors; and
   transmitting the N−1 transmit beamforming vectors to the transmitter.

17. The computer-readable medium of claim 16 wherein the channel state information includes a beamforming matrix to cause the transmitter to utilize N−1 spatial channels.

18. The computer-readable medium of claim 16 wherein the channel state information describes spatial channels in an orthogonal frequency division multiplexing (OFDM) multiple-input-multiple-output (MIMO) system.

19. A wireless communications device having N antennas, the wireless communications device having a combination of hardware and software components to always puncture one of N spatial channels, wherein the wireless communications device includes a combination of hardware and software to estimate N spatial channels and to transmit channel state information as N−1 beamforming vectors to a transmitter as feedback for use in antenna beamforming into only N−1 spatial channels, where N is greater than one and the N−1 beamforming vectors are calculated by not including the punctured channel.

20. The wireless communications device of claim 19 wherein the wireless communications device includes N−1 baseband data circuits to source data to a beamforming network.

21. The wireless communications device of claim 19 wherein N is equal to four, and three spatial channels are always used.

22. The wireless communications device of claim 19 wherein N is equal to three, and two spatial channels are always used.

* * * * *